United States Patent [19]

Furuya et al.

[11] Patent Number: 4,688,922
[45] Date of Patent: Aug. 25, 1987

[54] DISPLAY METHOD AND APPARATUS FOR CAMERA

[75] Inventors: Mikihito Furuya, Yokohama; Takashi Saegusa, Kawasaki, both of Japan

[73] Assignee: Nippon Kogaku K.K., Tokyo, Japan

[21] Appl. No.: 794,975

[22] Filed: Nov. 5, 1985

Related U.S. Application Data

[63] Continuation of Ser. No. 635,741, Jul. 30, 1984, abandoned.

[30] Foreign Application Priority Data

Aug. 2, 1983 [JP] Japan .................................. 58-141273

[51] Int. Cl.⁴ .......................... G03B 7/08; G03B 17/18
[52] U.S. Cl. ..................................... 354/441; 354/442; 354/445; 354/475; 354/286
[58] Field of Search ............... 354/142, 441, 445, 474, 354/475, 473, 472, 471, 286

[56] References Cited

U.S. PATENT DOCUMENTS

| | | | |
|---|---|---|---|
| 4,087,829 | 5/1978 | Ueda et al. | 354/442 |
| 4,090,207 | 5/1978 | Mashimo et al. | 354/444 |
| 4,168,892 | 9/1979 | Ueda et al. | 354/442 |
| 4,286,849 | 9/1981 | Uchidoi et al. | 354/442 |
| 4,344,681 | 8/1982 | Yamada | 354/442 |
| 4,437,752 | 3/1984 | Akashi et al. | 354/286 |

*Primary Examiner*—Russell E. Adams
*Attorney, Agent, or Firm*—Shapiro and Shapiro

[57] ABSTRACT

A display method and apparatus for a camera wherein when there is a possibility of achieving an optimal exposure for a preset aperture by closing or opening a diaphragm, a warning is displayed, so that the operator is informed of the fact that an optimal exposure can be obtained if he resets the aperture.

21 Claims, 26 Drawing Figures

P MODE

S MODE

A MODE

M MODE

P MODE

S MODE

A MODE

M MODE

P.S.A MODE

P.S.A MODE

P.S MODE

S MODE

A MODE

S MODE

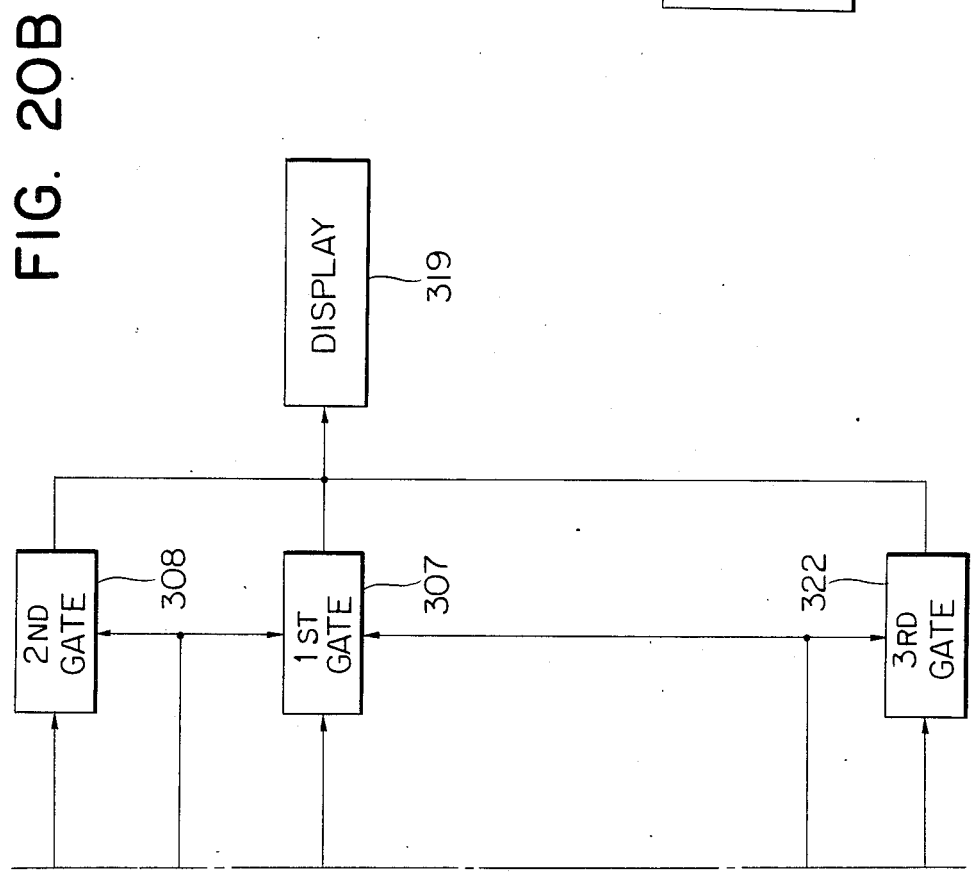

DISPLAY METHOD AND APPARATUS FOR CAMERA

This is a continuation application of Ser. No. 635,741 filed July 30, 1984, now abandoned.

BACKGROUND OF THE INVENTION

1. Field of the Invention

The present invention relates to a display method and apparatus for a camera.

2. Description of the Prior Art

In a conventional camera, when exposure is to be controlled in accordance with a preset aperture, if an optimal exposure is not obtained, this is detected and is displayed. However, with such a display method or apparatus, if the operator resets the preset aperture upon observing the display, he cannot determine if the updated preset aperture results in an optimal exposure.

SUMMARY OF THE INVENTION

It is an object of the present invention to provide a display method and apparatus for a camera wherein when there is a possibility of achieving an optimal exposure for a preset aperture by closing or opening a diaphragm, a warning is displayed, so that the operator is informed of the fact that an optimal exposure can be obtained if he resets the aperture.

BRIEF DESCRIPTION OF THE DRAWINGS

FIGS. 6A and 6B to 10 are plan views showing various warning states of the display in a viewfinder;

DETAILED DESCRIPTION OF THE PREFERRED EMBODIMENTS

Figure 1A:
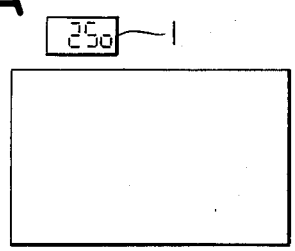
FIGS. 1A and 1B are plan views showing displays in a viewfinder in each mode.
Figure 1B:
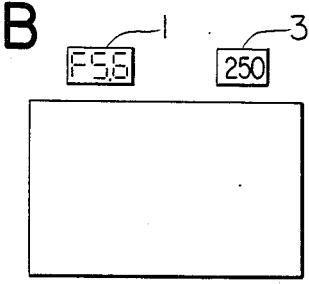

FIGS. 1A to 1D show display portions 1 to 3 in a viewfinder in respective modes, i.e., a program mode (P mode), a shutter speed priority mode (S mode), an aperture priority mode (A mode), and a manual mode (M mode). Display windows of the display portions which are not required in a selected mode are selectively shielded by a light-shielding lever which is operated interlinked with a mode selector lever for allowing selection of a mode from the P, S, A and M modes. Since the display windows of the first to third display portions 1 to 3 which must be shielded differ in accordance with the selected mode, the selected mode can be readily determined upon viewing through the viewfinder. The first display portion 1 always displays a target aperture, a shutter speed or a warning. The second display portion 2 displays a preset aperture in the A or M mode. The third display portion 3 displays the preset shutter speed in the S mode.

FIGS. 2 to 5 show the relationship between the positions of light-shielding levers 40 and 41 and display windows 2a and 3a viewed within the viewfinder in the P, S, A and M modes, respectively. The second display portion 2 displays as an image in the viewfinder through the optical system a preset aperture set by an aperture ring of the lens. The display window 2a is arranged in the optical axis of the optical system for projecting no image of the preset aperture into the viewfinder. The third display portion 3 displays as an image in the viewfinder through the optical system a shutter speed of a film rotating interlinked with a shutter dial on which a shutter speed is printed. The display window 3a is arranged on the optical axis of the optical system.

Figure 2:
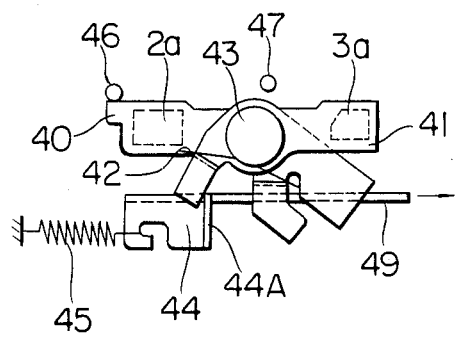
FIGS. 2 to 5 are plan views of a light-shielding device in a display window in each mode.

FIG. 2 corresponds to the P mode. The light-shielding levers 40 and 41 are mounted on a common shaft 43 fixed to a camera body such that the levers 40 and 41 are pivotal about the shaft 43. The light-shielding lever 40 has two light-shielding arms and one projection. The light-shielding lever 41 has one light-shielding arm and one projection. The light-shielding arms 40 and 41 are biased by a torsion spring 42 engaged with their projections in a direction to clamp a drive lever 44 and hence a bent portion 44A. The movement of the projection of the light-shielding lever 41 is limited by the bent portion 44A of the drive lever 44, and the movement of the arm of the light-shielding lever 40 is limited by a limiting pin 46 fixed on a display base. In the P mode, as shown in FIG. 2, the arms of the light-shielding levers 40 and 41 are on the optical paths of the second and third display portions 2 and 3, so that the display windows 2a and 3a are shielded.

Figure 3:
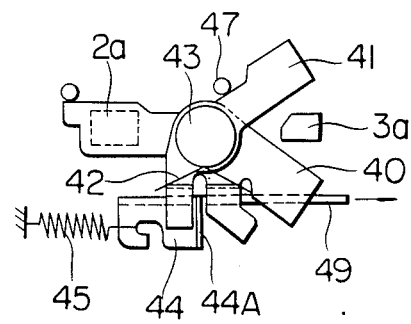

FIG. 3 shows the state in the S mode. When the mode selector lever is rotated, the drive lever 44 is pulled by a string 49 and is fixed at the S mode click position of the mode selector lever. The bent portion 44A of the drive lever 44 is shifted to the right. The light-shielding lever 41 is rotated counterclockwise by the force of the spring 42 until it abuts against a limiting pin 47 fixed on the display base. The light-shielding lever 40 is fixed in position. Therefore in the S mode, the state as shown in FIG. 3 is achieved, and the third display portion 3 can be viewed within the viewfinder.

Figure 4:
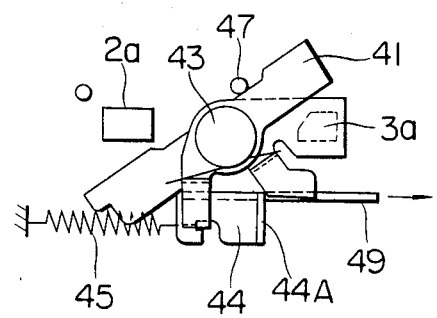

FIG. 4 shows the state in the A mode. In this mode, the drive lever 44 is moved further to the right. The bent portion 44A urges the projection of the light-shielding lever 40 so as to rotate the lever 40 counterclockwise. Then, the second display portion 2 can be viewed in the viewfinder, and the display window 3a is shielded by the other arm of the lever 40.

Figure 1C:
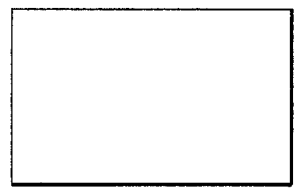
Figure 1D:
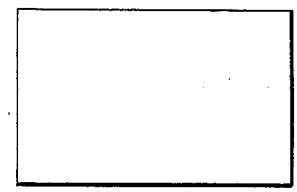
Figure 5:
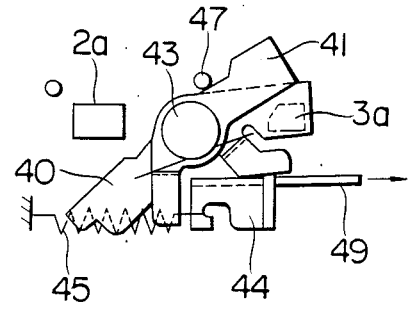

FIG. 5 shows the state in the M mode. Even if the drive lever 44 is moved further to the right, the projection of the light-shielding lever 40 serves as a cam. Therefore, the lever 40 does not substantially rotate counterclockwise, and the same light-shielding state as in the A mode is maintained. Discrimination between the A and M modes within the viewfinder can be performed by displaying "M" in the M mode by an LCD 10, as shown in FIG. 1D.

Figure 6A:
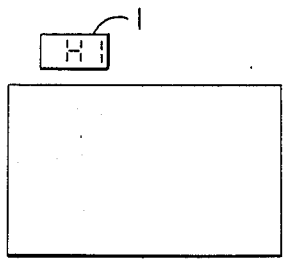
Figure 6B:
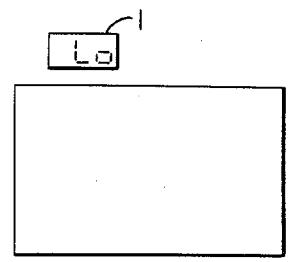
Figure 7:
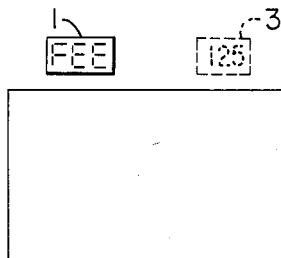
Figure 11:
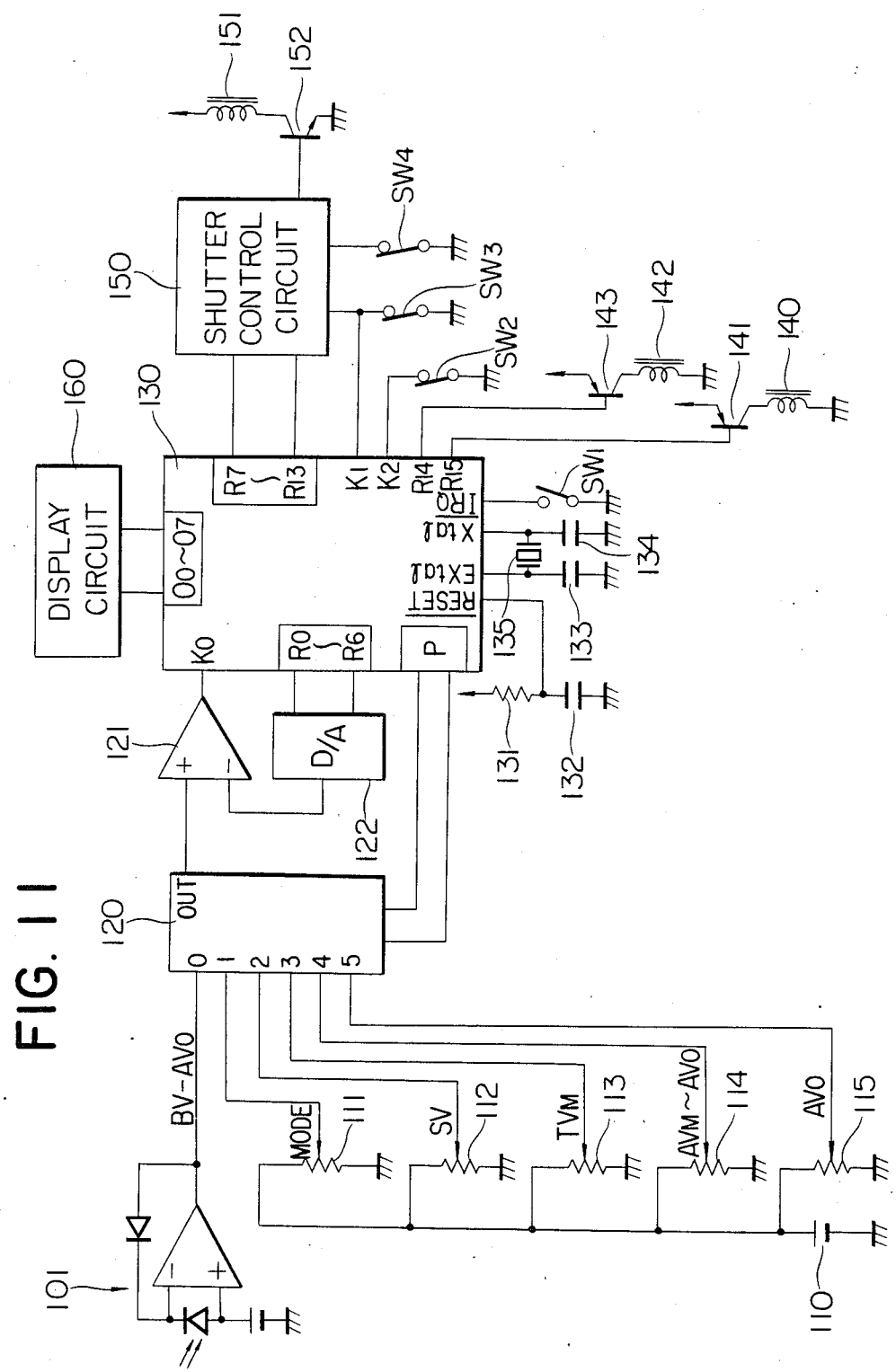
FIG. 11 is a block diagram of an embodiment of the present invention.

FIGS. 6A and 6B to 8 show warning displays in the respective modes. In each of the P, S and A modes as shown in FIGS. 6A and 6B, when the measured light quantity falls outside the interlocking range or metering range, and LCD 10 displays "Hi" or "Lo" in the first display portion 1. In the P mode, a target shutter speed (or aperture) is normally displayed at the first display portion 1. In the P mode, the aperture ring of the lens is preset such that the aperture lever of the lens is closed to a minimum aperture position. However, when this aperture setting is not correct, as shown in FIG. 11, a warning "FEE" (the F-number is in error) is displayed at the first display portion. When a shutter release button is depressed in this condition, an optimal exposure may be obtained. However, even in this case, the aperture control range is narrowed. Therefore, except for a case wherein the aperture is set at an intermediate value deliberately, the warning can be utilized for resetting the aperture.

Figure 8:
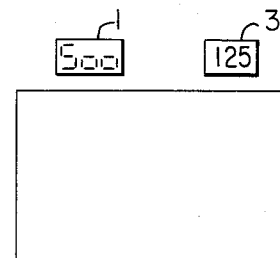
Figure 12:
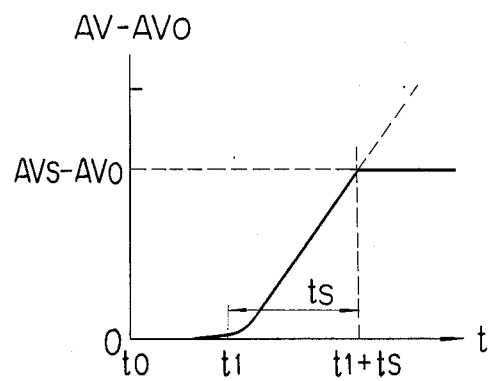
FIG. 12 is a graph showing an aperture control curve.

In the S mode, the target aperture is normally displayed at the first display portion 1. However, if an optimal exposure cannot be obtained with the reset shutter speed even if the diaphragm is fully opened, the shutter speed is shifted to a lower speed or a higher speed, whichever is necessary. When an optimal exposure can be obtained by such a shutter speed shift, the shutter speed is displayed at the first display portion as shown in FIG. 8 so that the operator can confirm the degree of shift of the shutter speed in units of EV. When the shutter release button is then depressed, the shutter is controlled in accordance with the shutter speed now displayed on the first display portion, so that an optimal exposure can be obtained. When the aperture ring of the lens is set at an intermediate position instead of at the fully closed position in the S mode, if an optimal exposure can be obtained with the intermediate aperture, the target aperture is displayed at the first display portion. When an optimal aperture can be obtained only after shifting the shutter speed, the target shutter speed obtained after such a shutter speed shift is displayed as shown in FIG. 12. If an optimal exposure still cannot be obtained even with such a shutter speed shift, the warning "FEE" is displayed at the first display portion, thus indicating an erroneous setting of the aperture. When the operator then resets the aperture, the exposure control range is widened. If an optimal exposure cannot be obtained even if the aperture is set correctly (to a minimum value), the display "Hi" or "Lo" is displayed while the aperture is set correctly.

Figure 10:
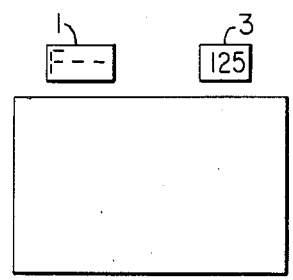

When an aperture is controlled using a lens without an aperture ring in the S mode, a warning "F— —" is displayed indicating that the aperture cannot be determined since no full aperture data is available, as shown in FIG. 10. In this case, the shutter speed is determined to be a preset value, and the aperture is controlled in accordance with a suitable aperture for achieving an optimal exposure. Thus, an optimal exposure is achieved. In the case when an optimal exposure can be obtained upon shifting the shutter speed, the shifted shutter speed is displayed (FIG. 12). In the case when an optimal exposure cannot be obtained upon shifting the shutter speed, a display "Hi" or "Lo" is displayed, as shown in FIG. 6A or 6B. In the A mode, the target shutter speed is displayed at the first display portion.

Figure 9:
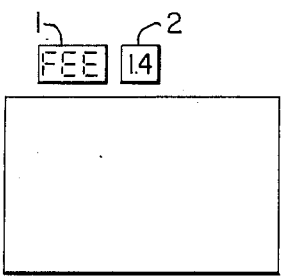

When the shutter speed for achieving an optimal exposure corresponding to the preset aperture exceeds a controllable range of shutter speed, if an optimal exposure can be obtained by fully opening or closing the diaphragm, a warning such as "FEE" is displayed, as shown in FIG. 9. A warning indicating that the metered light falls outside the interlock range or metering range in the case when an optimal exposure cannot be obtained upon opening/closing the diaphragm is displayed as "Hi" or "Lo", as in the case of the P or S mode. In the M mode shown in FIG. 1D, the preset shutter speed is displayed at the first display portion. This value is the preset shutter speed and is also a target shutter speed. A display "M−+ 125" is displayed in order to allow discrimination of the M mode from the A mode. In the display "M−+ 125", "M" represents the manual mode (M mode), and an optimal exposure is obtained when "−+" is displayed. Unlike in the P, S and A mode, "−" or "+" is displayed to indicate an underexposure or overexposure or light falling outside the interlock or metering range.

In this manner, in all of the P, S, A and M modes, the target shutter speed or aperture is displayed and easily confirmed within a viewfinder.

The electronic circuit for performing the above-mentioned display operation will be described below.

FIG. 11 is a block diagram for practicing the embodiment of the present invention. A metering circuit 101 is of a known type consisting of a first reference voltage source, a photodiode, a log diode, and an OP amplifier. A second reference voltage source 110 supplies a second reference voltage to information setting input sections 111 to 115. The first information setting input section 111 is set at a predetermined potential in accordance with a selected mode among the P, S, A and M modes. Similarly, the second to fifth information setting input sections 112 to 115 are set at predetermined potentials in accordance with a film speed (SV), a preset shutter speed ($TV_M$), an aperture control step number ($AV_M$-$AV_O$) of the preset aperture ($AV_M$), and a full aperture ($AV_O$), respectively. One of input terminals 0 to 5 of an analog switching circuit 120 is coupled to an output terminal OUT thereof by a P port output from a microcomputer unit (MCU) 130.

A D/A converter 122 generates 128 analog outputs 0 to 127 in accordance with a 7-bit output from output terminals $R_0$ to $R_6$ of the MCU 130. A comparator 121 compares an output from the analog switching circuit 120 and an output from the D/A converter 122, and supplies a comparison output to an input terminal $K_0$ of the MCU 130. The comparator 121, the D/A converter 122 and the MCU 130 constitute a comparing-A/D converting system. The MCU 130 is a known microcomputer unit. A Fujitsu 4-bit one-chip microcomputer MB8851 is shown in FIG. 11, but, since its configuration and function are already known, it will not be described herein.

An output from a circuit consisting of a resistor 131 and a capacitor 132 is supplied to a terminal RESET of the MCU 130. When power of the overall system is turned on, the MCU 130 is thus initialized in accordance with this output. An oscillator 135 (of quartz or ceramic) is supplied to capacitors 133 and 123 and to terminals Xtal and EXtal of the MCU 130, thereby constituting an oscillation circuit with the internal circuit of the MCU 130. A release switch $SW_1$ is connected to a terminal $\overline{IRQ}$ of the MCU 130. When the release switch $SW_1$ is turned on upon depression of the shutter release button, the MCU 130 branches from the main routine to an interrupt routine.

When a terminal $R_{15}$ of the MCU 130 goes from high level (H) to low level (L), a transistor 141 is turned on to supply a current to a release magnet 140. Then, a locking member (not shown) is released, and the mechanism for shutter control performs the release sequence.

When a terminal $R_{14}$ of the MCU 130 goes from H to L, a transistor 143 is turned on to supply a current to an aperture control stop magnet 142. Then, an aperture control stop member is operated to stop the diaphragm at a desired position. An aperture control start switch $SW_2$ is started at time $t_1$ delayed by a mechanical delay time from time $t_0$ at which the shutter release button is depressed. Then the aperture control start switch $SW_2$ is turned off, and is turned on during winding of the film. The MCU 130 calculates the aperture control step number ($AV_S-AV_O$) and an aperture control step time $t_s$ therefrom. After the time $t_s$ has elapsed, the MCU 130 changes the output from the terminal $R_{14}$ from H to L. In this manner, the aperture is controlled to a target value $AV_S$.

A shutter control circuit 150 receives the shutter speed control value calculated by the MCU 130 through its terminals $R_7$ to $R_{15}$. When the release sequence is started and a mirror switch $SW_3$ is turned off upon moving up of the mirror, a transistor 152 is turned on to supply a current to a rear curtain stop magnet 151. Then, a mechanical locking member for the rear curtain is released, and thus the rear curtain is electrically locked by this magnet. When a front curtain starts and a trigger switch $SW_4$ is turned off and a desired shutter speed is attained, the shutter control circuit 150 turns off the transistor 152 to stop supplying the current to the rear curtain stop magnet 151 to start the control of the shutter at a predetermined shutter speed by the rear curtain.

Figure 13:
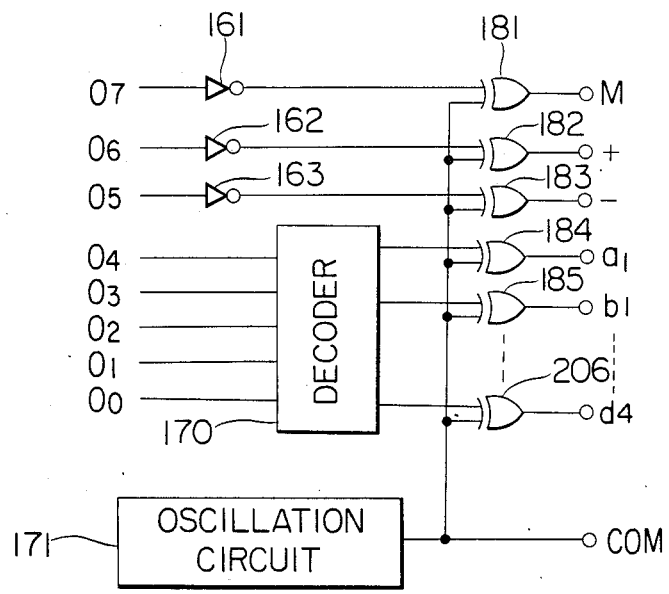
FIG. 13 is a block diagram of a display circuit 160.

A display circuit 160 has a circuit configuration, details of which are shown in FIG. 13. FIG. 13 shows a block diagram of the display circuit 160 which employs an LCD.

Referring to FIG. 13, a decoder 170 performs signal conversion as shown in Table 1 below.

TABLE 1

| $O_4O_3O_2O_1O_0$ | DISPLAY | $O_4O_3O_2O_1O_0$ | DISPLAY |
|---|---|---|---|
| 00000 | ⌐ - ⌐ | 10000 | 1 |
| 00001 | ⌐ 1 | 10001 | 2 |
| 00010 | ⌐ 2 | 10010 | 4 |
| 00011 | ⌐ 3 | 10011 | 8 |
| 00100 | ⌐ 4 | 10100 | 15 |
| 00101 | ⌐ 5 | 10101 | 30 |
| 00110 | ⌐ 6 | 10110 | 60 |
| 00111 | ⌐ 7 | 10111 | 125 |
| 01000 | ⌐ 8 | 11000 | 250 |
| 01001 | ⌐ 22 | 11001 | 500 |
| 01010 | ⌐ 32 | 11010 | 1000 |
| 01011 | ⌐ 45 | 11011 | 2000 |
| 01100 | ⌐ 64 | 11100 | 4000 |
| 01101 | 1 n | 11101 | 1 n |
| 01110 | H 1 | 11110 | H 1 |
| 01111 | ⌐EE | 11111 | · |

Figure 14:
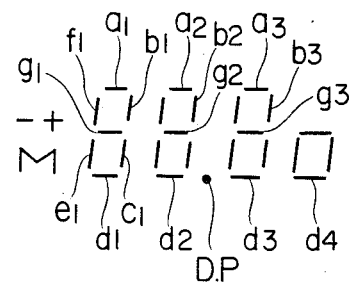
FIG. 14 is a plan view showing an LCD of a first display portion.
Figure 18:
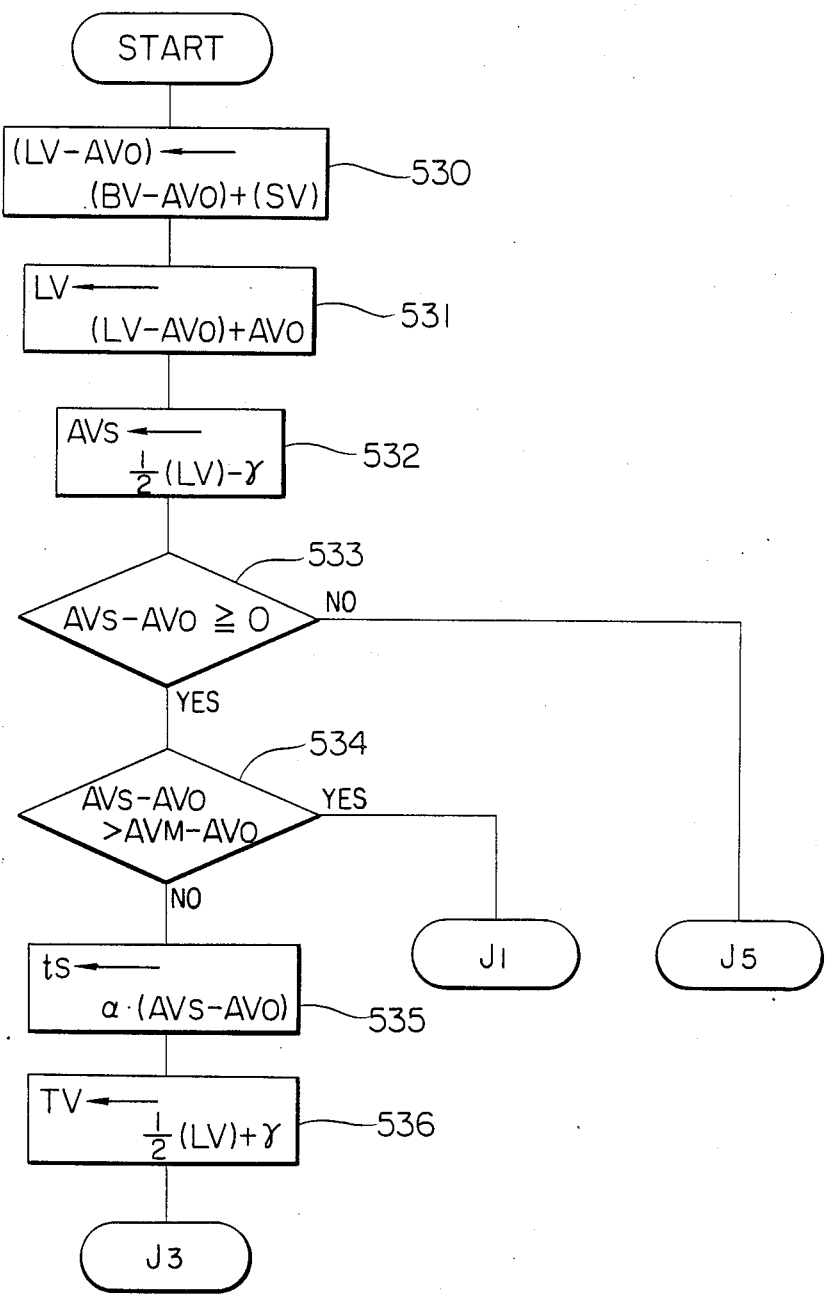
FIG. 18 is a subroutine flow chart for performing calculations in a P mode.

An oscillation circuit 171 generates a square wave for driving the LCD. EX-OR circuits 181 to 206 are connected to display elements "M", "+", "−", and segments $a_1, b_1, c_1, \ldots, g_1, a_2, b_2, \ldots, g_2$, D.P, $a_3, b_3, \ldots, g_3$, and $d_4$ of 7-segment elements, as shown in FIG. 18. When the output from an EX-OR circuit and a voltage on a COM terminal are in phase, the corresponding display element is turned off. Otherwise, the display element is turned on. When terminals $O_7, O_6$ and $O_5$ are respectively L, outputs from inverters 161, 162 and 163 are H and the display elements "M", "+" and "−" shown in FIG. 14 are turned on. The display shown in FIG. 14 corresponds to the display of the first display portion shown in FIG. 1. Immediately after power on of the overall system, the power-on reset is performed by the resistor 131 and the capacitor 132, and O port outputs from the terminals $O_7$ to $O_0$ of the MCU 130 all become H. Then, the displays "M−+" and "88.0" are all turned off. After a predetermined period of time calculated by the microcomputer has elapsed, that is, after the predetermined calculations are completed by the MCU 130, a predetermined display operation as described above is performed.

Figure 15:
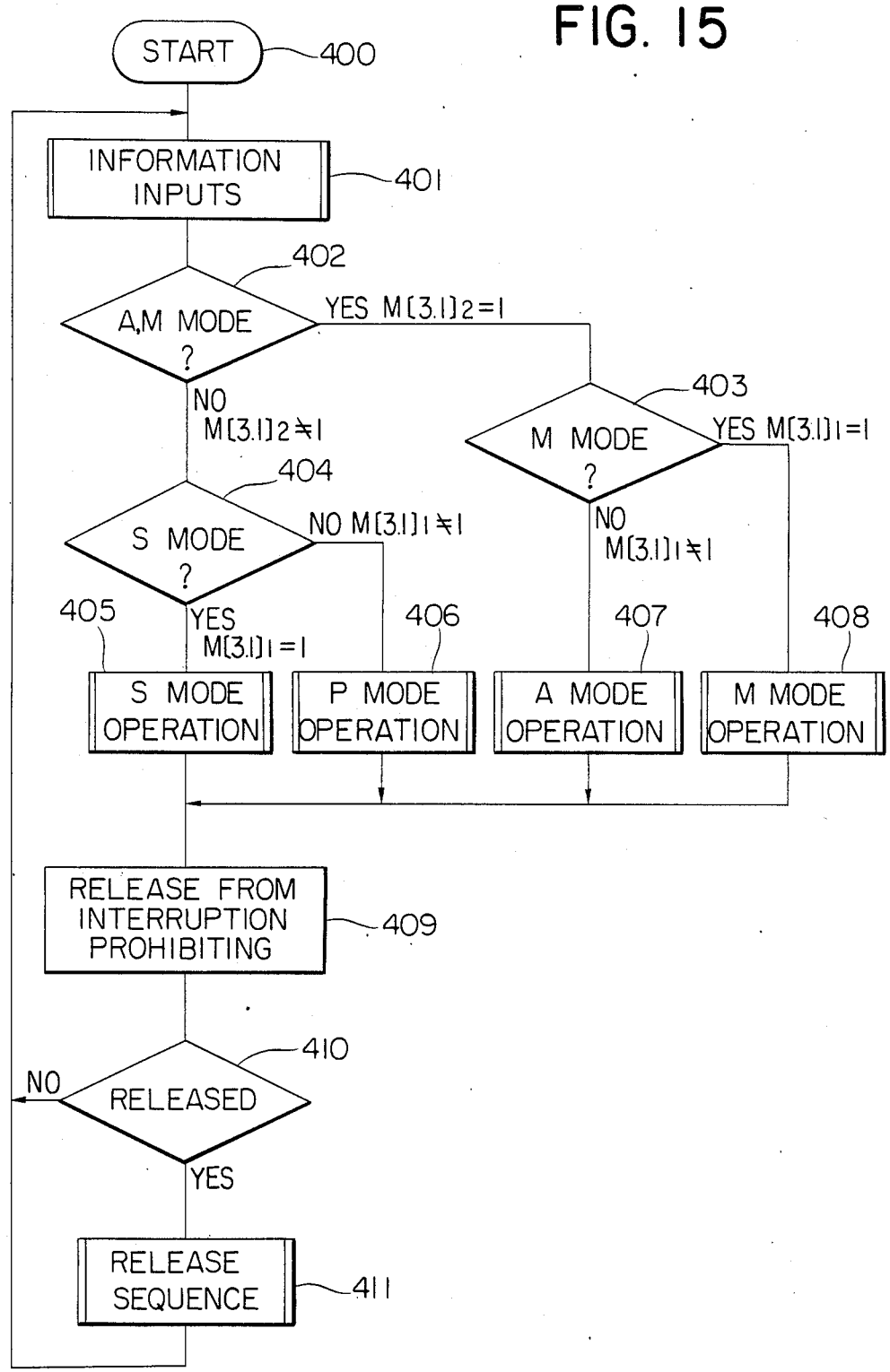
FIG. 15 shows a general flow chart of the embodiment of the present invention.

The operation of the MCU 130 will be described with reference to the flow sequence shown in FIG. 15. FIG. 15 shows a general flow chart of the MCU 130. When the power of the overall system is turned on, the MCU 130 is subjected to a power-on reset through a terminal $\overline{\text{RESET}}$. During this initialization, output ports of P, O and R are all set at H, an interrupt is inhibited, and the flow starts from address 000. Thereafter, the MCU 130 sequentially fetches the first to fifth information setting inputs and the metered light through the comparator 121, in step 401. In steps 402, 403, and 404, the MCU 130 determines if the selected mode is the M mode (step 408), the A mode (step 407), the P mode (step 406) or the S mode (step 405). In accordance with the selected mode, the MCU 130 performs an exposure calculation in the corresponding step and then releases an interrupt inhibition in step 409. If it is determined in step 410 that the shutter release button has been depressed, the release sequence is started as shown in FIG. 15. However, if it is determined in step 410 that the shutter release button has not been depressed, when the release switch $SW_1$ is turned on, a terminal $\overline{\text{IRQ}}$ is set at L to allow an interruption, thereby starting the release sequence.

Table 2 below shows the data table of a RAM (random-access memory) of the MCU 130.

TABLE 2

| | X | | | | | | | |
|---|---|---|---|---|---|---|---|---|
| Y | 0 | 1 | 2 | 3 | 4 | 5 | 6 | 7 |
| 0 | $t_{sl}$ | $DV_l$ | BV-$AV_O$ | | | | | |
| 1 | $t_{sh}$ | $DV_h$ | MODE | | | | | |
| 2 | | | SV | | | | | |
| 3 | | | TV | | | | | |
| 4 | | | ($AV_M$-$AV_O$) | | | | | |
| 5 | | | $AV_O$ | | | | | |
| 6 | | | | | | | | |
| . | | | | | | | | |
| . | | | | | | | | |
| E | | | (LV-$AV_O$) or ½ LV | | | | | |
| F | | | ($AV_S$-$AV_O$) | | | | | |

In the embodiment, one word consists of 4 bits. Thus, X register (bits 0 to 7) and Y register (bits 0 to $F) allow read/write of data of $8 \times 16 = 128$ words. Note that $ in this context means hexadecimal notation. 1 to 15 in decimal notation thus correspond to 1–9, and $A to $F in hexadecimal notation. In this embodiment, two words are used to store the 7-bit A/D converted signal. When the data of one word determined by the X and Y registers is represented by M[X, Y] (memory area of the RAM), a memory area M[3, Y] stores the upper 3-bit data of the 7-bit A/D converted signal, while a memory area M[2, Y] stores the lower 4-bit data of the 7-bit A/D converted signal. That is, as shown in Table 2, memory areas M[3, 0] and M[2, 0] store a metered output, i.e., (BV−AV$_0$). Similarly, memory areas M[3, 1] and M[2, 1] store the respective modes P, S, A and M. Memory areas M[3, 2] and M[2, 2] store the film speed SV. Memory areas M[3, 3] and M[2, 3] store the shutter speed TV$_M$. Memory areas M[3, 4] and M[2, 4] store the aperture control step number (AV$_M$−AV$_0$). Memory areas M[3, 5] and M[2, 5] store the fill aperture AV$_0$. The operation of the MCU 130 is as follows. The MCU 130 first sets the P port as shown in FIG. 11 and sets the Y register of the RAM at 5. Then the analog switching circuit 120 couples the input at the terminal 5 thereof, that is, the full aperture AV$_0$ to the terminal OUT. The signal from the terminal OUT is A/D converted and the digital signal obtained is stored in the memory areas M[3, 5] and M[2, 5]. Then, the P port and the Y register are incremented by one, respectively; the P port and the Y register are both set at 4 and an A/D conversion is performed. Then, the aperture control step number (AV$_M$−AV$_0$) is stored in the memory areas M[3, 4] and M[2, 4]. In a similar manner, the data on TV, SV, the selected mode, and (BV−AV$_0$) are stored as shown in Table 2. When the metered output (BV−AV$_0$) is A/D converted and the obtained digital signal is stored, Y=P=0. Therefore, if 1 is decremented from the value of the Y register, the value of the Y register becomes negative. Therefore, a jump to A/D conversion step is not performed, and the flow returns. This A/D conversion step is performed by the MCU 130, the D/A converter 122, and the comparator 121 shown in FIG. 11.

This embodiment of the present invention will be described in more detail referring back to the flow chart shown in FIG. 15. When the information is fetched or inputted through the comparator 121, the mode data is stored in the memory areas M[5, 1] and M[2, 1] of the RAM. Since the selected mode is one of M, A, S and P modes in this case, if 7-bit A/D conversion is performed, the lower three bits are not particularly required. Only variations in the input information due to variations in the resistance need be considered. Assume the following. When the data stored in the memory area M[3, 1] is "0111" or "0110", the selected xode is determined to be the M mode. When this data is "0101" or "0100", the selected mode is determined to be the A mode. When this data is "0011" or "0010", the selected mode is determined to be the S mode. When this mode is "0001" or "0000", the selected mode is determined to be the P mode. When data assignment is performed in this manner, if the digit of $2^2$ of the data of the memory area M[3, 1] is checked, the selected mode can be determined to be either the A or M mode; or the S or P mode. When the digit of $2^2$ is 1 indicating that the selected mode is either the A or M mode, the selected mode is determined to be the M mode if the digit of $2^1$ is 1, and the selected mode is determined to be the A mode if the digit of $2^1$ is 0. If the digit of $2^2$ is 0, the selected mode is the S or P mode. In this case, if the digit of $2^1$ is 1, the selected mode is determined to be the S mode. However, if the digit of $2^1$ is 0, the selected mode is determined to be the P mode.

Then, the calculation is performed in accordance with the mode determination, as shown in FIG. 15.

A calculation to be performed when the selected mode is determined to be the A mode will be described with reference to the flow chart shown in FIG. 16.

In step 501, the value of (BV−AV$_0$) stored in the memory areas M[3, 0] and M[2, 0] is transferred to the memory areas M[3, E] and M[2, E]. Then, the value of (BV−AV$_0$) stored in the memory areas M[3, E] and M[2, E] and the value of SV stored in the memory areas M[3, 2] and M[2, 2] are added. The calculation is performed as follows:

$$(BV-AV_0)+SV=(BV+SV)-AV_0 \quad (1)$$

where LV is a light value given by:

$$LV \equiv BV+SV \quad (2)$$

Thus, (LV−AV$_0$) is stored in the memory areas M[3, E] and M[2, E]. In step 502, (LV−AV$_0$) is stored in the memory areas M[3, 3] and M[2, 3]. (AV−AV$_0$) stored in the memory areas M[3, 4] and M[2, 4] is subtracted from (LV−AV$_0$). This is expressed in equation form as:

$$(LV-AV_0)-(AV_M-AV_0) \equiv LV-AV_M=TV \quad (3)$$

Thus, a shutter speed TV$_s$ set as a control target in accordance with the preset aperture AV$_M$ is thus obtained. In step 503, the following operation is performed:

$$t_s = t_{lim} \quad (4)$$

where t$_{lim}$ is the time interval required to close the diaphragm to the minimum aperture. In the A mode, the diaphragm is stopped at a position corresponding to the preset aperture set by the aperture ring, not by the MCU 130 but by a mechanical means (not shown) interlocked with the shutter release button.

In step 504, a decision is performed to determine if the shutter speed TV$_S$ is equal to or greater than the minimum shutter speed TV$_{min}$. If NO in step 504, that is, if the following relation is established:

$$TV_S < TV_{min} \quad (5)$$

the minimum shutter speed TV$_{min}$ is stored in the memory areas M[3, 3] and M[2, 3] in step 514. As a display value DV, the upper 4 bits of the data TV$_{min}$ are stored in the memory area M[1, 1] and the lower 4 bits thereof are stored in the memory area M[1, 0], as shown in Table 2. In step 515, $FD (where $ indicates hexadecimal notation) is stored as DV and $FD is produced at the O ports. Thus, as shown in step 510, the terminals O$_7$ to O$_5$ are set as "111", and the terminals O$_4$ to O$_0$ are set as "11101". Thus, a warning "Lo" shown in Table 1 is displayed as shown in FIG. 6B. Meanwhile, the data TV$_{min}$ is set at the terminals R$_{13}$ to R$_7$. Then, after the release operation is performed, the shutter is controlled to the minimum shutter speed TV$_{min}$.

However, if it is determined in step 504 that the following relation is established:

$$TV_S \geq TV_{min} \quad (6)$$

the following decision is made in step 505:

$$TV_S \leq TV_{max} \quad (7)$$

If YES in step 505, the data TV stored in the memory areas M[3, 3] and M[2, 3] is divided by 6 (the data TV is divided by 6 to achieve the display in one step since the calculation data is 1/6 in this embodiment), and the quotient is stored as DV1 in the memory area M[1, 0], in step 512. In step 513, $F is stored as DV$_h$ in the memory area M[1, 1]. Then, the shutter speed as a control target such as "1", "2", ..., "125", "2000", or "4000" is displayed. This shutter speed is displayed as shown in FIG. 1C so that the operator can see it. When it is determined in step 505 that:

$$TV_S > TV_{max} \tag{8}$$

it indicates that the shutter speed is greater than a maximum shutter speed $TV_{max}$. In step 506, the data $TV_{max}$ is stored in the memory areas M[3, 3] and M[2, 3]. In step 506, the full aperture $AV_0$ stored in the memory areas M[3, 5] and M[2, 5] is added to $(AV_M - AV_0)$ stored in the memory areas M[3, 4] and M[2, 4], thereby performing a calculation:

$$(AV_M - AV_0) + (AV_0) = AV \tag{9}$$

Thus, the aperture $AV_M$ is calculated. In step 507, the aperture $AV_M$ is compared with a predetermined aperture $AV_x$ (not necessarily the minimum aperture $AV_{min}$ of the lens). When YES in step 507, that is, when the following relation is established:

$$AV_M > AV_x \tag{10}$$

it is determined that the diaphragm is satisfactorily closed. In step 511, $FE is stored as DV in the memory areas M[1, 1] and M[1, 0]. The outputs from the terminals $O_7$ to $O_0$ become $FE, and the display becomes "Hi" as shown in FIG. 6A to indicate a maximum light limit. However, if it is determined in step 507 that:

$$AV_M \leq AV_x \tag{11}$$

the aperture preset by the aperture ring is not large enough. Thus, in step 508, $EF is stored as DV in the memory areas M[1, 1] and M[1, 0]. Therefore, the outputs from the terminals $O_7$ to $O_0$ become $EF, and a display becomes as "FEE", as shown in FIG. 9. This display warns to the operator that if the diaphragm is closed, the controlled light amount may fall outside the control light. In either of the relations (10) and (11), since $TV_{max}$ is stored as TV, the data $TV_{max}$ is produced at the terminals $R_{13}$ to $R_7$. After shutter release, the shutter speed is controlled at a maximum shutter speed.

The calculation flow chart in the S mode shown in FIG. 17 will now be described.

In step 517, as in step 501 in the A mode, the calculation according to the relation (1) is performed. In step 518, $(LV - AV_0)$ stored in the memory areas M[3, E] and M[2, E] is transferred to the memory areas M[3, F] and M[2, F]. The value of TV (the TV value set by the shutter dial; i.e., $TV_M$) stored in the memory areas M[3, 3] and M[2, 3] is subtracted from the value stored in the memory areas M[3, F] and M[2, F]. That is, the following operation is performed:

$$(LV - AV_0) - TV_M = (LV - TV_M) - AV_0 \tag{12}$$

If the aperture as a target value is $AV_S$, since $$LV = TV_M + AV_S \tag{13}$$

substitution of the relation (13) in the relation (12) yields:

$$(LV - AV_0) - TV_M = AV_S - AV_0 \tag{14}$$

If the aperture control step number $(AV_S - AV_0)$ from the full aperture becomes the value stored in the memory areas M[3, F] and M[2, F]. It is then discriminated in step 519 if the calculation is negative. If it is determined that:

$$AV_S - AV_0 < 0 \tag{15}$$

since the diaphragm cannot be opened beyond the full aperture condition, the light amount deficiency must be compensated for by increasing the shutter speed. In step 528, in order to provide the full aperture, the memory areas M[0, 0] and M[0, 1] are cleared such that $$t_s = 0 \tag{16}$$

Figure 16:
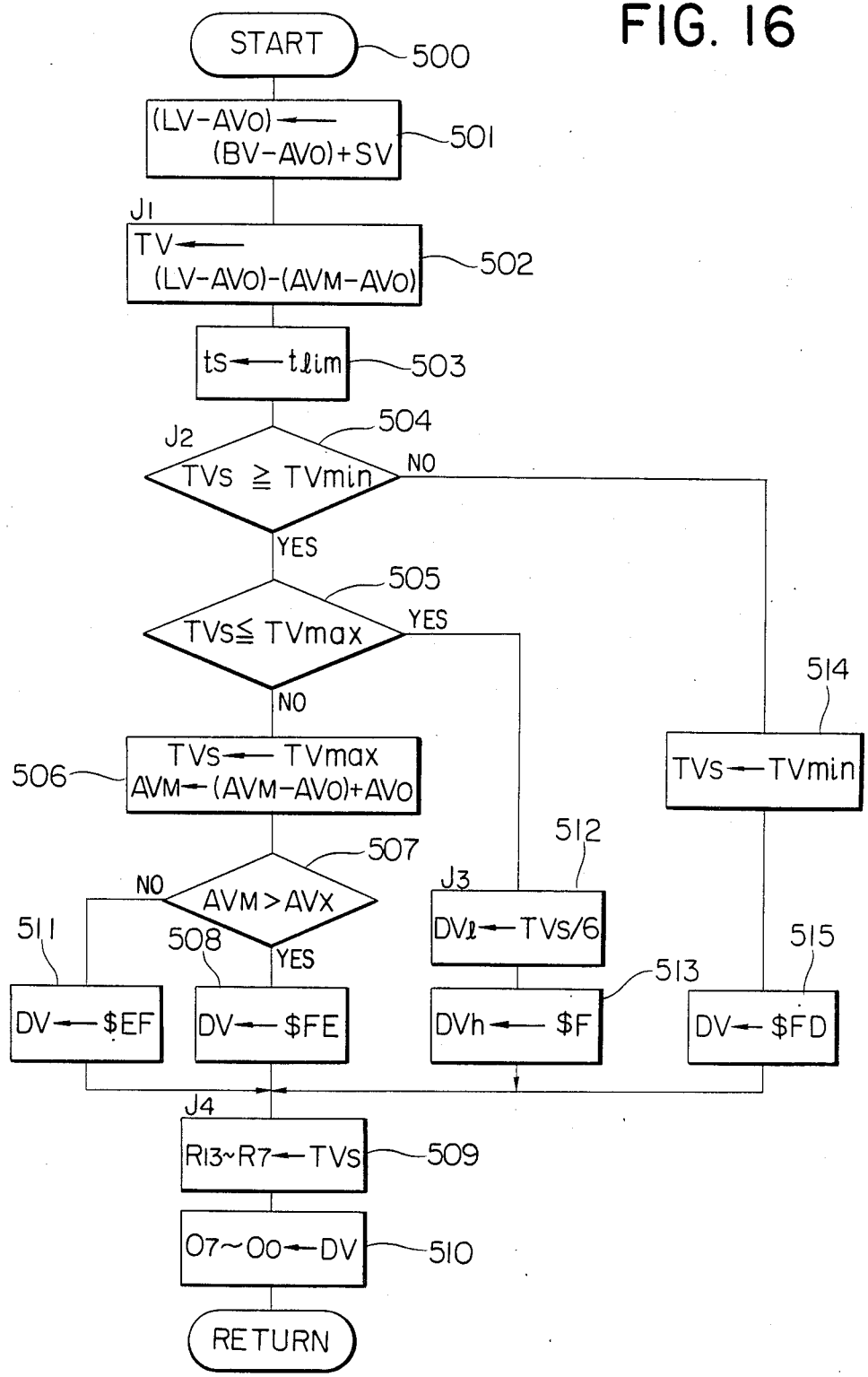
FIG. 16 shows a subroutine flow chart for performing calculations in an A mode.

In step 529, $(LV - AV_0)$ (this corresponds to the value of TV for achieving an optimal exposure at a full aperture) in the memory areas M[3, E] and M[2, E] is transferred to the memory areas M[3, 3] and M[2, 3]. A subtraction;

$$TV_S = LV - AV_0 \tag{17}$$

is performed, and the flow jumps to J2 or step 504 in FIG. 16.

On the other hand, if the following relation is satisfied in step 519;

$$AV_S - AV_0 \geq 0 \tag{18}$$

$(AV_S - AV_0)$ in the memory areas M[3, F] and M[2, F] is compared with $(AV_M - AV_0)$ in the memory areas M[3, 4] and M[2, 4], in step 520. If it is determined in step 520 that:

$$(AV_S - AV_0) > (AV_M - AV_0) \tag{19}$$

it is determined that:
$$AV_S > AV_M \tag{20}$$

This indicates that the aperture $AV_S$ as a control target for achieving an optimal exposure is greater than the minimum aperture $AV_M$ mechanically preset by the aperture ring. Since the aperture cannot be decreased below the minimum aperture presettable by the aperture ring, an overexposure occurs if the shutter speed is kept the same. Thus, the shutter speed must be shifted to a higher speed. The flow then jumps to J1 or step 502 in FIG. 16. The aperture is controlled to be the minimum aperture $AV_M$, the shutter speed is controlled in accordance with the relation (3), and a corresponding display is performed. In this case, if the relation (8) is established and the shifted shutter speed exceeds a maximum speed, a display "Hi" is performed provided that the diaphragm is fully closed (below $AV_x$) and the relation (10) is established. However, if the diaphragm is not fully closed and the relation (11) is established, a warning "FEE" is displayed to warn the operator of the need for closing the diaphragm more. If the following relation is established:

$$AV_S - AV_0 \geq AV_M - AV_0 \tag{21}$$

it is determined that the aperture $AV_S$ as a control target is between the full aperture $AV_0$ and the minimum aperture $AV_M$ presettable by the aperture ring. This case corresponds to the shutter speed priority range wherein the aperture is controlled while the shutter speed is kept the same. Therefore, a calculation:

$$(AV_S - AV_0) \times \alpha = t_s \qquad (22)$$

where

α is a constant is performed to set $t_s$ in the memory areas M[0, 1] and M[0, 0], in step 521. It is then checked in step 522 if the signal of the full aperture $AV_0$ is transmitted. This is because the full aperture is required in order to display the aperture. If a lens which does not have a signal member for the full aperture $AV_0$ is mounted, the transmission member is not operated. Therefore, the fifth information setting input is at a minimum level, and the value stored in the memory areas M[3, 5] and M[2, 5] is $00. In step 525, the DV value of the memory areas M[1, 1] and M[1, 0] is set as $E0, "1100000B" is produced at the terminals $O_7$ to $O_0$, and a warning "F— —" is displayed, as shown in FIG. 10. This indicates to the operator that a lens of old type is mounted and the aperture cannot be displayed. However, control operation is performed in accordance with a preset shutter speed.

When the signal of the full aperture $AV_0$ is determined to be present in step 522, the value of the memory areas M[3, 5] and M[2, 5] becomes greater than $00, indicating the signal is preset. In step 523, $(AV_S-AV_0)$ in the memory areas M[3, F] and M[2, F] is added to the value of $AV_0$ in the memory areas M[3, 5] and M[2, 5], thereby performing the operation:

$$(AV_S - AV_0) + AV_0 = AV_S \qquad (23)$$

Since the value of $AV_S$ is set in 1/6EV steps, the value of a $AV_S$ is divided by 6, the quotient is stored as $DV_l$ in the memory area M[1, 0], and $E is stored as $DV_h$ in the memory area M[1, 1], in step 524. Then, the output from the terminals $O_7$ to $O_0$ changes from "11100001B" to "11101100B", and a display "F1.2", "F1.H" or "F64" is performed in accordance with the obtained value of $AV_s/6$. In this case, since the value of $TV_M$ in the memory areas M[3, 3] and M[2, 3] has not changed, the flow jumps to J4 or step 509 in FIG. 16. When the value of TV is produced at the terminals $R_{13}$ to $R_7$, the preset value $TV_M$ is produced. Therefore, after the release operation, the shutter speed is controlled to coincide with the preset shutter speed.

FIG. 18 is a flow chart of the calculation in the P mode. In the first step 530, as in the case of the S mode, the operation is performed in accordance with the relation (1). $(LV-AV_0)$ is stored in the memory areas M[3, E] and M[2, E]. In step 531, the value of $AV_0$ in the memory areas M[3, 5] and M[2, 3] is added to $LV-AV_0$, thereby performing:

$$LV = (LV - AV_0) + AV_0 \qquad (24)$$

In step 532, the carry flag is set to 0. The data in the memory areas M[3, E] and M[2, E] is sequentially loaded in an accumulator and LV is divided by 2 for program exposure control in accordance with an ROR instruction (instruction for setting in the accumulator and the carry flag the result obtained by one-bit rotation toward the LSB of the data in the accumulator through the carry flag). The obtained result LV/2 is stored in the memory areas M[3, E] and M[2, E] and is then transferred to the memory areas M[3, F] and M[2, F]. A constant γ is subtracted from the value of LV/2 to obtain an aperture $AV_S$ as a target aperture as follows:

$$AV_S = LV/2 - \gamma \qquad (25)$$

Subsequently, the value of $AV_0$ in the memory areas M[3, 5] and M[2, 5] is subtracted from $AV_S$ in the memory areas M[3, F] and M[2, F] so as to calculate a target aperture control step $(AV_S-AV_0)$ in the P mode as follows:

$$(AV_S - AV_0) = (AV_S) - (AV_0) \qquad (26)$$

Figure 17:
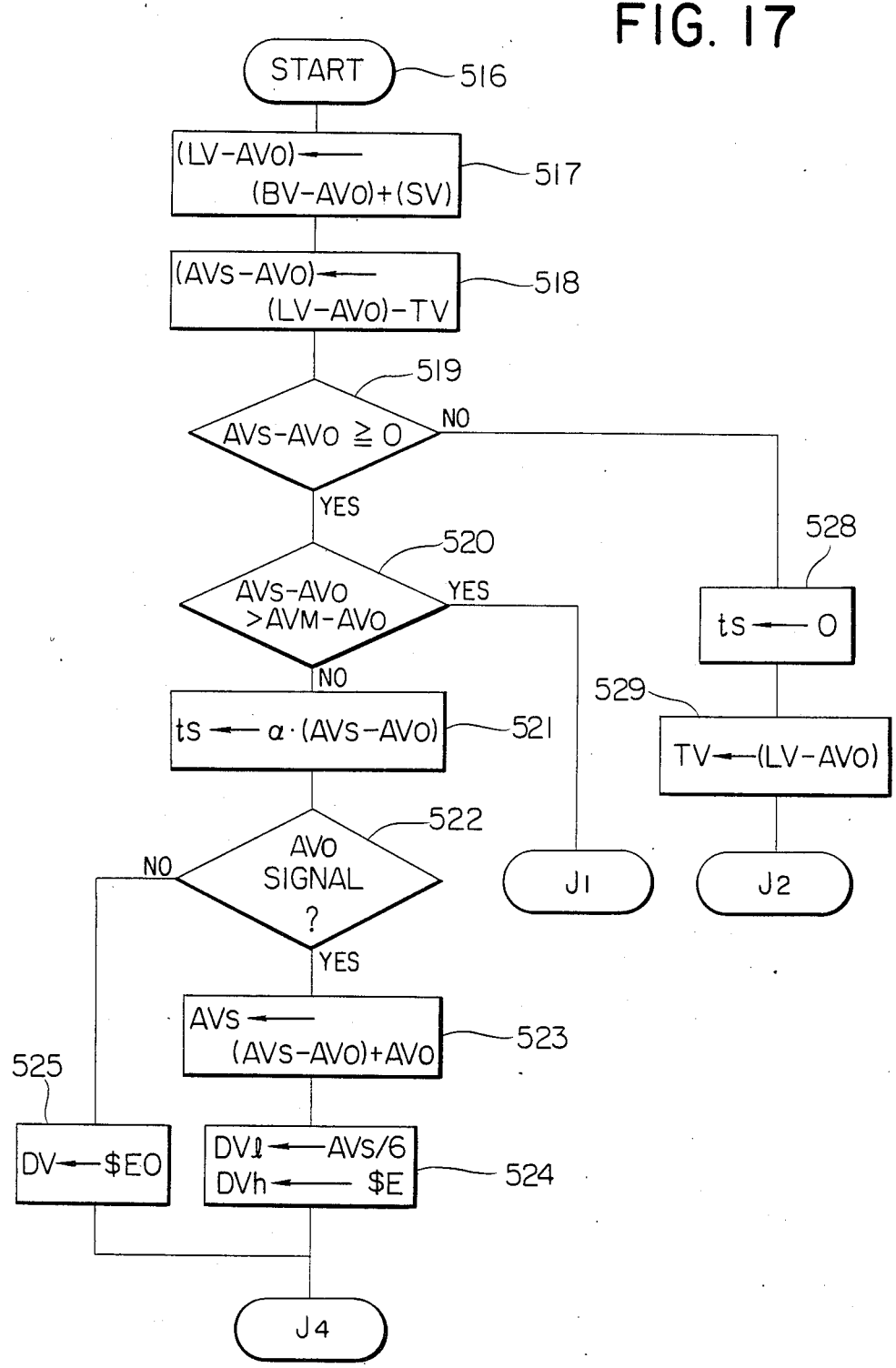
FIG. 17 shows a subroutine flow chart for performing calculations in an S mode.

When the calculation result of the equation (26) is negative and the relation (15) $(AV_S-AV_0)<0$ is established, the flow jumps to J5 or step 528 in FIG. 17, as in the case of the S mode, to control the aperture at the full aperture. A shutter speed corresponding to this aperture is displayed and control is performed accordingly. When the result of the relation (25) is positive and the relation (18) $(AV_S-AV_0) \geq 0$ is established, $(AV_S-AV_0)$ and $(AV_M-AV_0)$ are compared in step 534. When the relation (19) $(AV_S-AV_0)>(AV_M-AV_0)$ is established, the shutter speed must be shifted toward a higher shutter speed. Therefore, as in the case of the S mode, the flow jumps to J1 or step 502 in FIG. 16 so as to control the shutter speed in accordance with the preset aperture set by the aperture ring of the lens. Then, the shutter speed is displayed and corresponding control is performed. When the shutter speed has reached a maximum possible value, a warning "Hi" or "FEE" is displayed.

When the relation (20) $(AV_S>AV_M)$ is established, the target aperture $AV_S$ is between the full aperture $AV_0$ and the minimum aperture $AV_M$ which can be set by the aperture ring of the lens, that is, within the aperture control range. Therefore, as in the case of the S mode, in step 535, the calculation of the relation (22) is performed, and the value of $t_s$ is stored in the memory areas M[0, 1] and M[0, 0]. Next, in step 536, the value of LV/2 in the memory areas M[3, E] and M[2, E] is stored in the memory areas M[3, 3] and M[3, E], and the constant γ is added thereto. Thus, the target shutter speed $TV_S$ in the P mode is calculated in accordance with the following relation:

$$TV_S = LV/2 + \gamma \qquad (27)$$

Then, the display output DV is calculated in accordance with the shutter speed $TV_S$ calculated in J3 or step 512 in FIG. 16. The value of TV and the display output DV are outputted to the terminals $R_{13}$ to $R_7$ and $O_7$ to $O_0$. After the shutter release operation, the shutter speed is controlled to be the target shutter speed, and the aperture is accordingly controlled.

In order to facilitate easy understanding, the functions of the overall apparatus of the embodiment described above will be described briefly with reference to the block diagram shown in FIG. 19. A display signal generator 201 generates the signals corresponding to the target aperture value $AV_S$ in the S mode, the target shutter speed $TV_S$ in the A mode, the target aperture $AV_S$ and/or the target shutter speed $TV_S$ in the P mode. A first gate 202 is controlled by an output from a first comparator 203. The first gate 202 is normally enabled to transmit the output signals from the display signal generator 201 to a display 204 which displays the target values $AV_S$ and $TV_S$. A second gate 206 is controlled by an output from a first selecting circuit 207 so as to transmit a signal from a first warning signal generator 205 to the display 204. A third gate 209 is controlled by an output from a second selecting circuit 210 so as to transmit a signal from a second warning signal generator 208 to the display 204. The comparator 203 compares the output $TV_S$ from a $TV_S$ signal generator 211 with the output $TV_x$ from a $TV_x$ signal generator 212. When the following relation is established:

$$TV_S > TV_x \qquad (a)$$

the first gate 202 is closed to transmit the signal to the first and second selecting circuits 207 and 210. Note that $TV_x$ is a maximum shutter speed. A second comparator 213 compares the output $AV_M$ from an $AV_M$ signal generator 214 with the output $AV_x$ from an $AV_x$ signal generator 215. When the following relation is established:

$$AV_M > AV_x \qquad (b)$$

a signal is supplied to the first selecting circuit 207. However, when the following relation is established:

$$AV_M \leq AV_x \qquad (c)$$

a signal is supplied to the second selecting circuit 210. When both the relations (a) and (b) are satisfied, the first selecting circuit 207 is enabled and the second gate 206 is enabled to transmit the output from the first warning signal generator 205 to the display 204. Then, the display 204 displays a warning "Hi". This warning indicates that the target shutter speed exceeds the maximum shutter speed. When both the relations (a) and (c) are satisfied, the second selecting circuit 210 is enabled and the third gate 209 is enabled to transmit the output from the second warning signal generator 208 to the display 204. Then, the display 204 displays a warning "FEE". This warning indicates that when the diaphragm is closed further in this state, an optimal exposure may be obtained without exceeding the maximum shutter speed.

Figure 19:
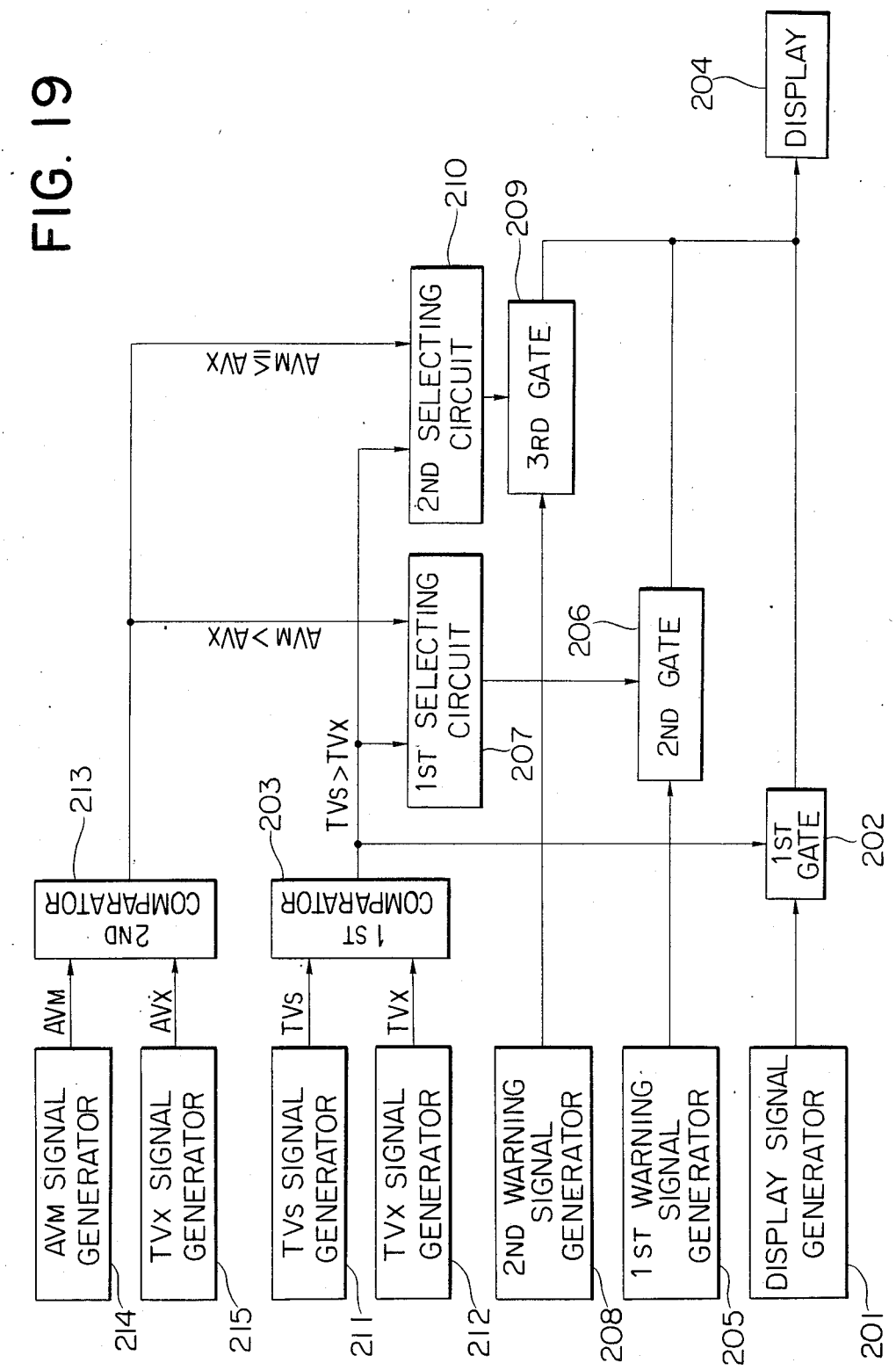
FIG. 19 is a block diagram showing functions of the various components of the embodiment.
Figure 20A:
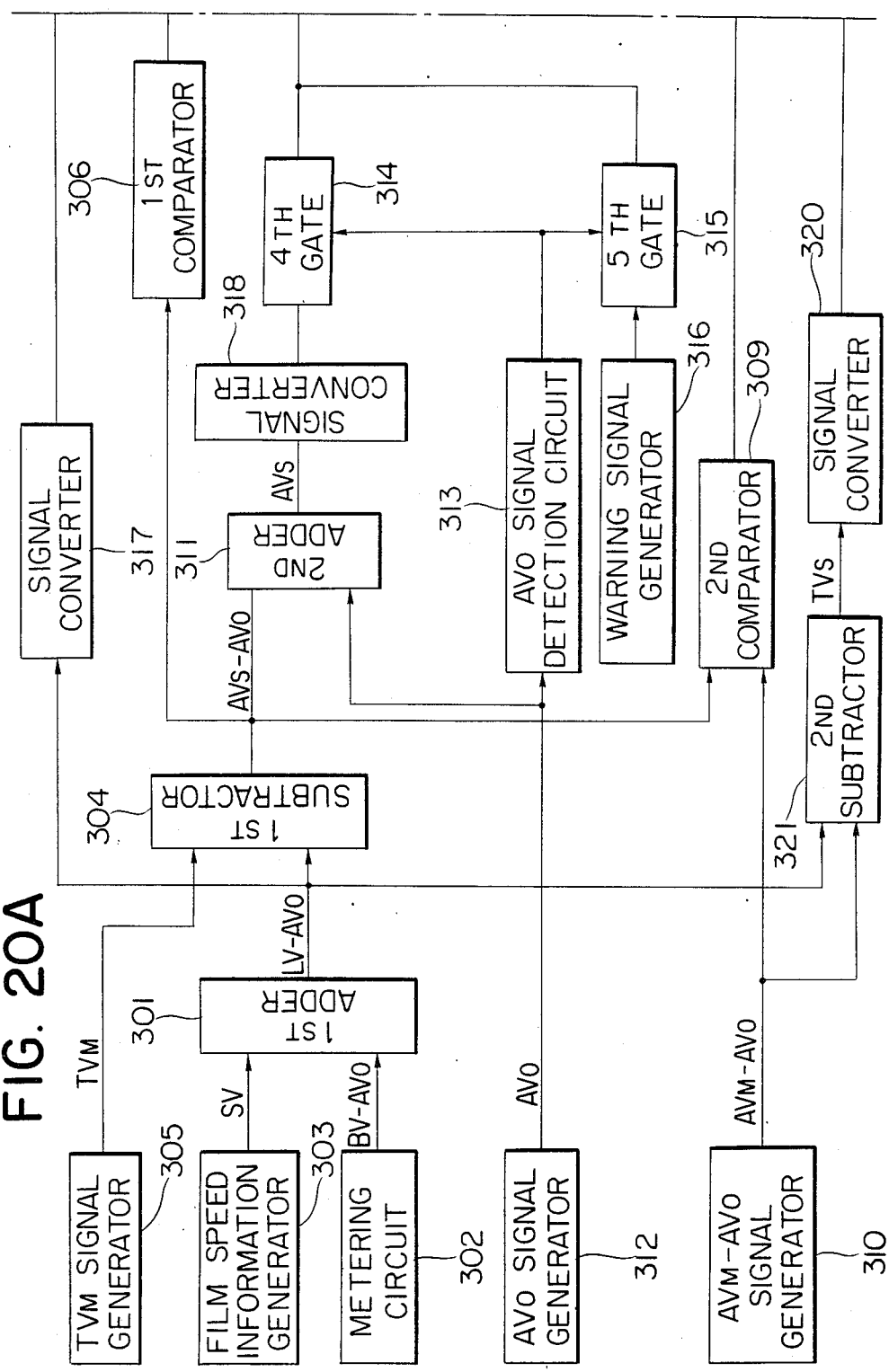
FIG. 20 composed of FIGS. 20A and 20B is a block diagram when the functions of the various components of the embodiment are viewed from a different viewpoint.

The functions of the apparatus of the embodiment described above will also be described from a different viewpoint than that in FIG. 19. FIG. 20 is a block diagram pertaining to such a description. A first adder 301 adds the output ($BV - AV_0$) from a metering circuit 302 and the output SV from a film speed information generator 303 as follows:

$$(BV - AV_0) + SV = (BV + SV) - AV_0 = LV - AV_0$$

When the preset shutter speed is represented by $TV_M$, a first subtractor 304 subtracts the output $TV_M$ from a $TV_M$ signal generator 305 from the output ($LV - AV_0$) from the first adder 301 as follows:

$$(LV - AV_0) - TV_M = (AV_S + TV_M) - AV - TV_M$$
$$= AV_S - AV_0$$

Note that $AV_S$ is a target aperture. When the output ($AV_S - AV_0$) from the first subtractor 304 is negative, a first comparator 306 disables a first gate 307 and enables a second gate 308. This is a case wherein the diaphragm must be opened further for aperture control, and in order to attain an optimal exposure the shutter speed must be shifted to a speed lower than the preset shutter speed $TV_M$. A second comparator 309 compares the output ($AV_M - AV_0$) from an $AV_M - AV_0$ signal generator 310 and the output ($AV_S - AV_0$) from the first subtractor 304. When the following relation is established:

$$(AV_S - AV_0) > (AV_M - AV_0)$$

the first gate 307 is disabled and a third gate 322 is enabled. This is a case wherein the diaphragm must be closed from the preset aperture with the preset shutter speed, and in order to attain an optimal exposure the shutter speed must be shifted to a speed higher than the preset shutter speed $TV_M$.

A second adder 311 adds the output ($AV_S - AV_0$) from the first subtractor 304 and the output $AV_0$ from an $AV_0$ signal generator 312 as follows:

$$(AV_S - AV_0) + (AV_0) = AV_S$$

so as to obtain the target aperture $AV_S$.

An $AV_0$ signal detection circuit 313 detects if the lens for obtaining a predetermined signal is mounted on the camera body, in accordance with the output $AV_0$ from the $AV_0$ signal generator 312. When it is determined that the predetermined signal cannot be obtained, a fourth gate 314 is disabled and a fifth gate 315 is enabled so as to transmit the output from a warning signal generator 316 to the first gate 307. When the first gate 307 is not disabled by the first and second comparators 306 and 309, that is, when control can be performed in accordance with the preset shutter speed without any limitation, the first gate 307 is enabled to transmit to a display 319 an output selected by the fourth or fifth gate 314 or 315. Therefore, when a signal is supplied through the gate 314, the target aperture is supplied to the display 319. However, when a signal is supplied through the gate 315, a warning "F- -" indicating that a predetermined signal is not present is displayed at the display 319. A first signal converter 317 converts the output ($LV - AV_0$) from the first adder 301 (corresponding to the shutter speed at the full aperture) into a signal for display. When this signal is supplied to the display 319 through the gate 308, the display 319 displays the shutter speed. A second signal converter 318 converts the output $AV_S$ from the second adder 311 into a signal for display. The converted signal is supplied to the display 319 when both the fourth and second gates 314 and 308 are enabled. The display 319 displays the target aperture in accordance with the thus received signal. A third signal converter 320 converts the output ($LV - AV_M$) from the second subtractor 321 into a signal for display. When this signal is supplied to the display 319 through a third gate 322, the display 319 displays the target shutter speed.

In accordance with the present invention, when the lens mounted on the camera main body cannot provide a signal representing a full aperture, the apparatus displays a warning "F- -".

According to the present invention, in all modes, when an optimal exposure can be obtained, a target shutter speed or aperture is displayed at the first display portion. However, when an optimal exposure cannot be obtained, a warning is displayed. Furthermore, since the display position or method in a viewfinder is different for each mode, the operator can easily confirm the selected mode and the displays are easy to see. In the shutter speed priority mode, the target aperture is normally displayed. However, when the shutter speed is to be shifted, the shutter speed to be attained after such a shift is displayed. Therefore, the operator can check if the shutter speed is shifted. In this case, since the preset shutter speed is also displayed at the third display portion, the number of shift units of EV can be confirmed within the viewfinder. If an optimal exposure can be attained after the shutter speed is shifted, the shutter speed after the shifting is also displayed. Therefore, as compared with an apparatus wherein only a warning is displayed, the apparatus of the present invention allows confirmation of whether the optimal exposure is attained. Even if the operator does not reset the aperture, shutter release can be performed, resulting in easier operation. When the aperture is preset erroneously (when the aperture is not preset below a predetermined value), not only a warning is displayed but also a target aperture is displayed for attaining an optimal exposure. When the shutter speed is also shifted, the target shutter speed after the shift is also displayed. Since the optimal exposure can be obtained in this manner, the aperture or shutter speed need not be reset. If an optimal exposure cannot be obtained even after the shutter speed shift, an erroneous aperture setting is warned, so that the operator can then reset the aperture. When the operator actually wants to take a picture at the first preset aperture, he simply confirms the preset aperture when the target shutter speed is displayed. When the maximum or minimum shutter speed is selected for the preset aperture in the A mode and an optimal exposure can be obtained after closing or opening the diaphragm, a maximum or minimum light limit is not displayed. Instead, a warning ("FEE" in FIG. 9) is displayed indicating a need for changing the preset aperture. Even if the target aperture cannot be displayed since a lens incapable of providing full aperture information is used, the aperture is controlled to a suitable target aperture (for attaining the optimal exposure). When control is performed in accordance with the preset shutter speed, a warning "F — —" is displayed as shown in FIG. 10, so that the operator can confirm this fact. When the shutter speed must be shifted, a shutter speed which is changed can be displayed at the first display portion as in the case of other lens. In this manner, the number of types of lens which can be used can be increased.

What is claimed is:

1. A camera which is capable of driving an aperture diaphragm of a phototaking lens from a fully open aperture to a manually set aperture value, and which, upon driving a shutter with manually set shutter speed, controls driving of the aperture diaphragm in order to obtain an optimal exposure, comprising:
    (a) means for determining an aperture value for obtaining an optimal exposure at said manually set shutter speed;
    (b) means for detecting that the aperture value determined by said determining means is greater than said manually set aperture value and generating a first detection signal;
    (c) means for detecting that said manually set aperture value is smaller than a predetermined aperture value, and generating a second detection signal; and
    (d) a single display means for displaying generation of said first and second detection signals.

2. A camera according to claim 1, wherein said camera further comprises means for detecting that said manually set aperture value is greater than said predetermined aperture value and generating a third detection signal, and
    said single display means displays generation of said first and third detection signals in a different manner from said displaying of generation of said first and second detection signals.

3. A camera according to claim 1, wherein said single display means displays, when it is possible to obtain an optimal exposure by said manually set shutter speed and an aperture value within a range from said fully open aperture value to said manually set aperture value, an aperture value enabling obtention of the optimal exposure, and said display means displays, when the aperture value determined by said determining means is out of a range from said manually set aperture value to said fully open aperture value, and when a shutter speed obtaining an optimal exposure at the manually set aperture value is within a range where shutter speed is controllable and is different from said manually set shutter speed, said shutter speed obtaining the optimal exposure.

4. A camera which is capable of driving an aperture diaphragm of a phototaking lens from a fully open aperture to a manually set aperture value, and which determines an aperture value and a shutter speed for an optimal exposure and controls the apertures diaphragm and a shutter, comprising:
    (a) means for detecting that an amount of exposure based on said manually set aperture value and a maximum shutter speed is above the amount of an optimal exposure and generating a first detection signal;
    (b) means for detecting that a predetermined aperture value is greater than said manually set aperture value and generating a second detection signal; and
    (c) single display means for displaying generation of said first and second detection signals.

5. A camera according to claim 4, wherein said camera further includes means for detecting that said manually set aperture value is greater than said predetermined aperture value and generating a third detection signal,
    said single display means displaying generation of said first and third detection signals in a different manner from that of display of said first and second detection signals.

6. A camera upon which is mountable a first phototaking lens having a fully open aperture value information as well as a second phototaking lens having no fully open aperture value information and which controls an aperture diaphragm of each of the mounted first and second phototaking lenses between said fully open aperture and a manually set aperture value in accordance with a preset shutter speed:
    (a) means for detecting said fully open aperture value information and generating a signal corresponding to said fully open aperture value information;
    (b) means for determining, in accordance with said fully open aperture value information and said preset shutter speed, an aperture value for obtaining an optimal exposure at said preset shutter speed, the determining means generating an output signal indicative of said determined aperture value;
    (c) single display means for displaying said determined aperture value in accordance with said output signal from said determining means; and
    (d) means for detecting that no fully open aperture value signal is generated and generating a detection signal, wherein said single display means displays generation of said detection signal in lieu of display of said determined aperture value.

7. A camera according to claim 6, wherein said single display means has a predetermined area for displaying said determined aperture value, in which area is also displayed generation of said detection signal.

8. A camera body to which a phototaking lens generating an optical property signal indicative of information relating to an optical property is removably attached, comprising:
(a) means for receiving said optical property signal;
(b) means for detecting that said optical property signal is not received by the receiving means and generating a detection signal; and
(c) display means having a plurality of segments by some of which is displayed that said detection signal is generated, said display means displaying "F— —" in response to said detection signal.

9. A camera body according to claim 8, wherein said camera body further comprises operating means for computing an aperture value of said phototaking lens for obtaining a proper exposure in accordance with said optical property signal; and
said display means displays the aperture value computed by said operating means.

10. A camera body according to claim 9, wherein the aperture value is displayed together with the "F" of said "F— —" to replace the "— —" of said "F— —".

11. A camera body to which is removably attached a phototaking lens generating an optical property signal containing information relating to an optical property comprising:
(a) means for receiving said optical property signal;
(b) means for detecting that said optical property signal is not received by said receiving means and generating a dectection signal;
(c) operating means for computing an aperture value of said phototaking lens for obtaining a proper exposure in accordance with said optical property signal received by said receiving means; and
(d) display means having a plurality of areas for displaying the aperture value computed by the operating means when said detection signal is not generated, said display means displaying, with at least a portion of said areas, that said detection signal has been generated when said detection signal has been generated.

12. A camera body according to claim 11, wherein said display means displays "F— —" in at least a portion of said areas in response to said detection signal.

13. A camera body according to claim 12, wherein "F" of said "F— —" is displayed at a predetermined area of said areas, and said display means displays said "F" at said predetermined area when said detection signal is not generated, and displays the numerical value of the aperture value computed by said generating means at the remaining areas other than said predetermined area.

14. A camera body to which is removably attached a phototaking lens generating a predetermined signal comprising:
(a) means for receiving said predetermined signal;
(b) means for detecting that said predetermined signal is not received by said receiving means and generating a detection signal;
(c) operating means for computing an aperture value of said phototaking lens for obtaining a proper exposure; and
(d) display means having a plurality of areas for displaying the numerical value of the aperture value computed by the operating means when said detection signal is not generated, said display means displaying, with at least a portion of said plurality of areas, that said detection signal has been generated when said detection signal has been generated.

15. A camera body according to claim 14, wherein said operating means computes the aperture value of said phototaking lens for obtaining the proper exposure in response to said detection signal.

16. A camera body according to claim 15, wherein said display means displays "— —" in at least a portion of said plurality of areas in response to said detection signal.

17. A camera body according to claim 16, wherein said display means has another plurality of areas for displaying "F", and said another plurality of areas is disposed adjacent to the first-mentioned plurality of areas.

18. A camera body according to claim 17, wherein said display means displays "F" with said another plurality of areas irrespective of said detection signal.

19. A camera body to which is removably attached a phototaking lens generating a predetermined signal comprising:
(a) means for receiving said predetermined signal;
(b) means for detecting that said predetermined signal is not received by said receiving means and generating a detection signal; and
(c) display means having a plurality of segments for displaying an aperture value when said detection signal is generated, said display means displaying, with a portion of said plurality of segments, "F— —" in response to said detection signal.

20. A camera body to which is removably attached a phototaking lens generating a predetermined signal comprising:
(a) means for receiving said predetermined signal;
(b) means for detecting that said predetermined signal is not received by said receiving means and generating a detection signal; and
(c) display means having a plurality of segments for displaying the numerical value of an aperture value when said detection signal is not generated, said display means displaying, with a portion of said plurality of segments, "— —" in response to said detection signal.

21. A camera body according to claim 20, wherein said display means has another plurality of segments for displaying "F", and said another plurality of segments is disposed adjacent to the first-mentioned plurality of segments.

* * * * *